United States Patent
Quiroz de la Mora et al.

(10) Patent No.: US 9,817,234 B2
(45) Date of Patent: Nov. 14, 2017

(54) MISUSE DETECTION FOR DISPLAY COMBINER

(71) Applicant: Continental Automotive Systems, Inc., Auburn Hills, MI (US)

(72) Inventors: Luis Ernesto Quiroz de la Mora, Tlaquepaque (MX); Robert Wolfgang Kissel, Egelsbach (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/928,054

(22) Filed: Oct. 30, 2015

(65) Prior Publication Data
US 2017/0123205 A1    May 4, 2017

(51) Int. Cl.
*G02B 27/01* (2006.01)

(52) U.S. Cl.
CPC .. *G02B 27/0149* (2013.01); *G02B 2027/0154* (2013.01); *G02B 2027/0163* (2013.01); *G02B 2027/0167* (2013.01)

(58) Field of Classification Search
CPC ............ G02B 27/0149; G02B 27/0179; G02B 2027/0154; G02B 2027/0161; G02B 2027/0163; G02B 2027/0167
USPC ...................................................... 359/630
See application file for complete search history.

(56) References Cited

U.S. PATENT DOCUMENTS

| | | | |
|---|---|---|---|
| 7,978,414 B2 | 7/2011 | Potakowskyj et al. | |
| 8,072,743 B2 * | 12/2011 | Kissel | B60R 11/0235 224/483 |
| 8,385,074 B2 * | 2/2013 | Karl | B60R 11/0229 361/679.41 |
| 8,427,751 B2 | 4/2013 | Noel et al. | |
| 9,063,339 B2 | 6/2015 | Hou et al. | |
| 9,116,339 B2 | 8/2015 | Ruyten | |
| 9,188,780 B2 * | 11/2015 | Potakowskyj | G02B 27/0149 |
| 2005/0018392 A1 * | 1/2005 | Strohmeier | B60R 11/0205 361/679.55 |
| 2008/0258138 A1 | 10/2008 | Song et al. | |
| 2016/0147066 A1 * | 5/2016 | Ogasawara | G02B 27/0149 359/630 |

OTHER PUBLICATIONS

U.S. Appl. No. 14/453,943, filed Aug. 7, 2014, Dynamically Calibrated Head-Up Display, Continental Automotive Systems, Inc.

* cited by examiner

*Primary Examiner* — Zachary Wilkes

(57) ABSTRACT

A head-up display positioning device includes a combiner configured to reflect a generated image to create a virtual image for viewing by an occupant of a vehicle. A housing is provided for stowing the combiner. A mechanism includes a motor and is configured to the move the combiner between a stowed position wherein the combiner is located fully within the housing and a display position wherein the combiner is at least partially located outside of the housing and viewable by the occupant. A cover is configured to close over the housing when the combiner is in the stowed position, and the cover is movable to allow the combiner to move into the display position. The mechanism is configured to automatically stow the combiner under certain conditions.

14 Claims, 16 Drawing Sheets

MISUSE DETECTION FOR DISPLAY COMBINER

FIELD

The present disclosure relates to see-through displays, such as head-up displays (HUD), for presenting a virtual image to an occupant on a transparent or translucent surface.

BACKGROUND

Modern vehicles typically include a see-through display, such as a head-up display, in a passenger cabin to communicate information to an operator of the vehicle. The information can include a vehicle condition such as a fuel level or velocity of the vehicle, as well as warning icons, known as tell-tales. Typical head-up displays project an image including the information onto a predetermined area of a display screen adjacent to a windshield or that is part of the windshield. A virtual image is formed that the driver sees projected out over the road or another object on the road outside of the vehicle.

Some head-up display devices are repositionable, for example, to accommodate drivers having varying heights. These and other head-up displays may include an image projector and a combiner upon which the image is projected. The positioning system may be delicate and intended to automatic movement, not manual movement by a vehicle operator. If a vehicle operator tries to move the combiner, however, he/she may damage the head-up display device. Accordingly, there exists a need for dealing with situations where the operator tries to manual move the combiner, in order to protect the head-up display.

SUMMARY

The present disclosure provides a head-up display positioning device that positions the combiner and detects misuse of the combiner. The head-up display positioning device may automatically shut down and close the head-up display if someone attempts to manually move the combiner.

In one variation, which may be combined with or separate from the other variations described herein, a head-up display positioning device is provided that includes a combiner configured to reflect a generated image to create a virtual image for viewing by an occupant of a vehicle. A housing is configured to selectively stow the combiner. A mechanism including a motor is configured to move the combiner between a stowed position wherein the combiner is located fully within the housing and a display position wherein the combiner is at least partially located outside of the housing and viewable by the occupant. A cover is configured to close over the housing when the combiner is in the stowed position, and the cover is movable to allow the combiner to move into the display position. A mechanism is configured to automatically stow the combiner in the stowed position within the housing and close the cover when a predetermined external force is applied to the combiner.

In another variation, which may be combined with or separate from the other variations described herein, a head-up display positioning device is provided that also includes a combiner configured to reflect a generated image to create a virtual image for viewing by an occupant of a vehicle. A housing is provided for stowing the combiner. A mechanism including a motor is configured to move the combiner between a stowed position wherein the combiner is located fully within the housing and a display position wherein the combiner is at least partially located outside of the housing and viewable by the occupant. A cover is configured to close over the housing when the combiner is in the stowed position, and the cover is movable to allow the combiner to move into the display position. A misuse arm is configured to selectively activate a controller to cause the mechanism to automatically stow the combiner in the stowed position within the housing and close the cover.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

BRIEF DESCRIPTION OF THE DRAWINGS

Examples are reflected in the drawings, which will be described below. The drawings described herein are for illustration purposes only and are not intended to limit the scope of the present disclosure in any way.

Figure 5:
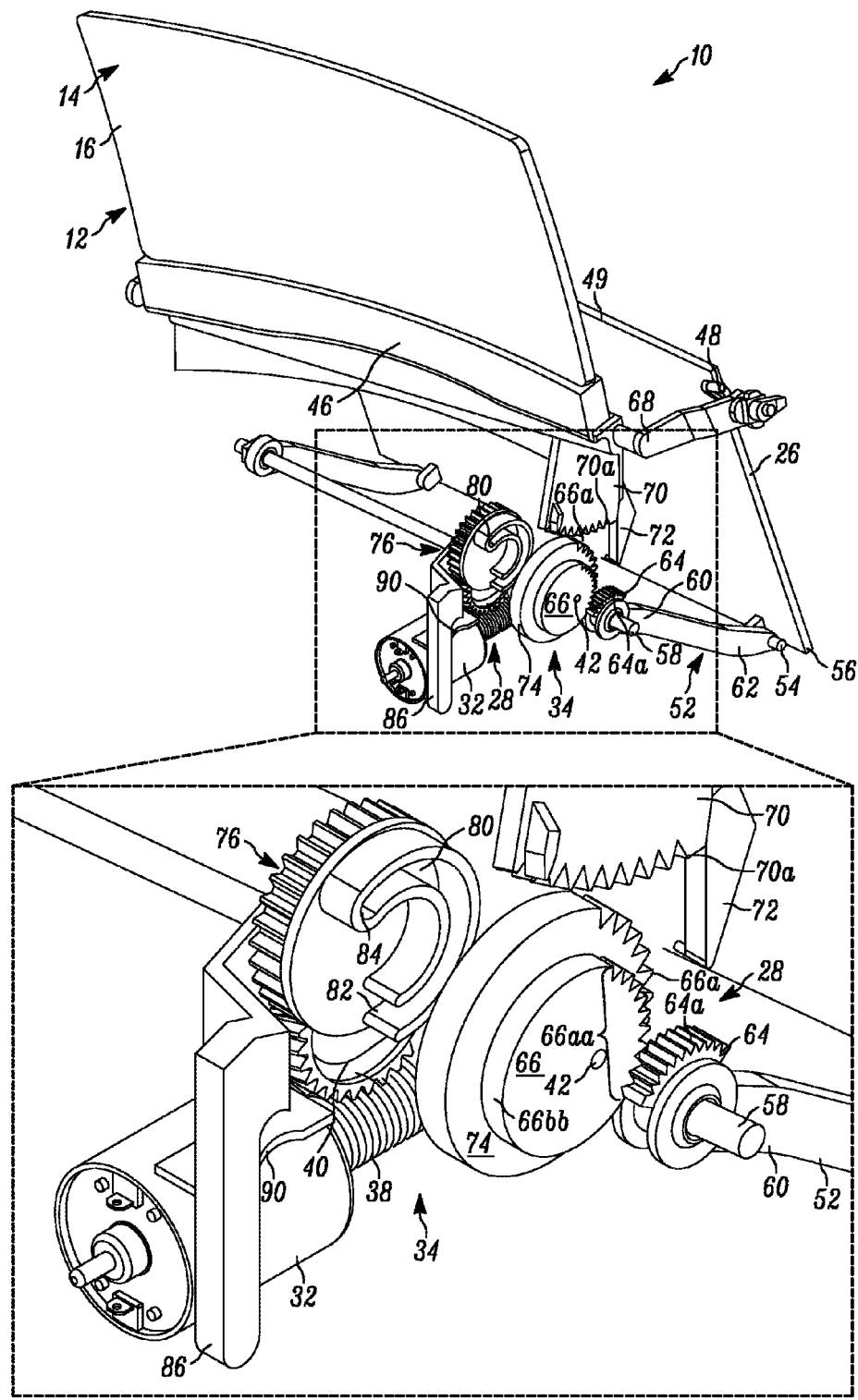
FIG. 5 is a perspective left-front side cutaway view of a portion of the head-up display positioning device of FIGS. 1A-4 in a fourth partially open position with a blown-up section, in accordance with the principles of the present disclosure.
Figure 6:
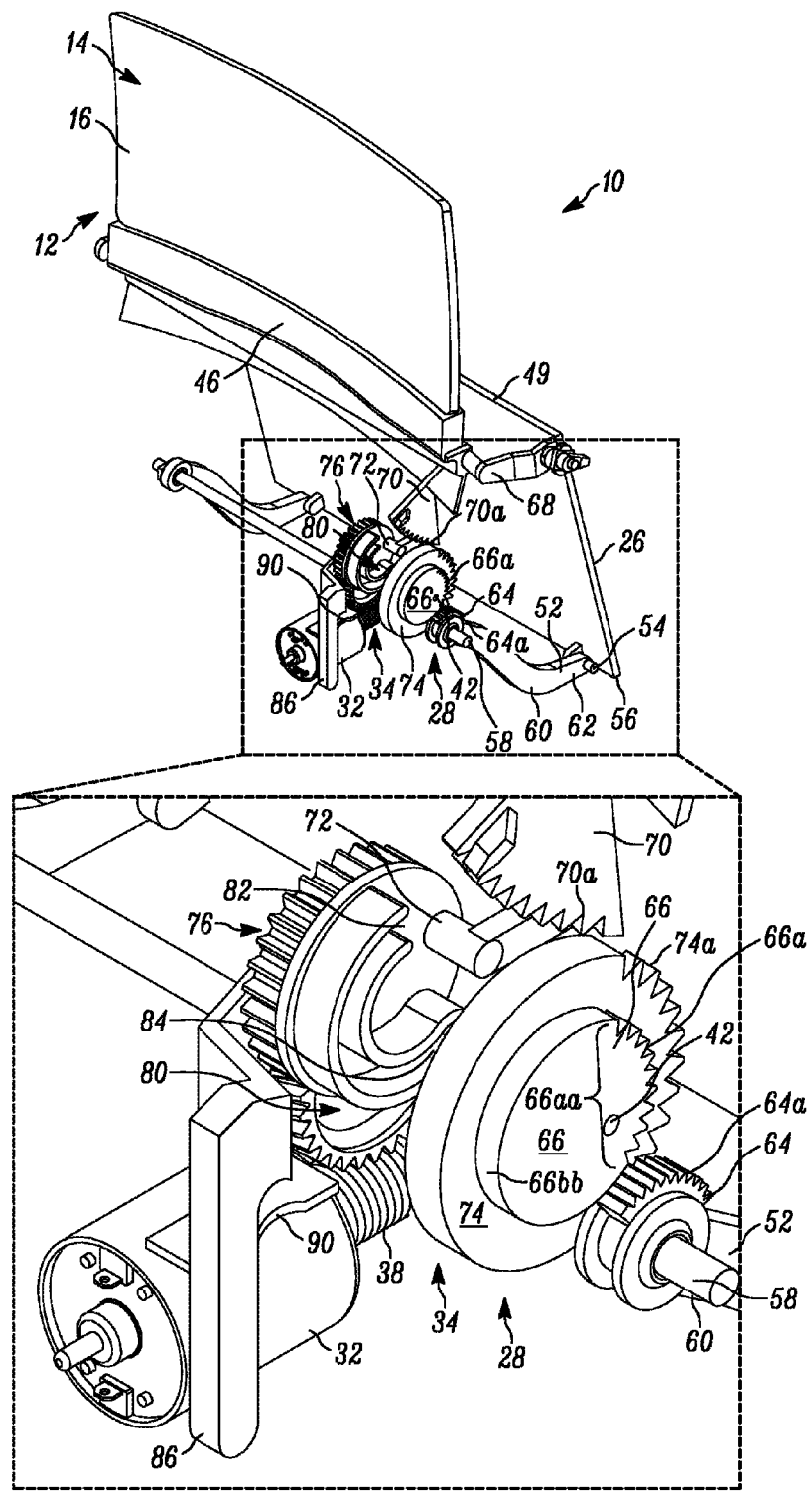
FIG. 6 is a perspective left-front side cutaway view of a portion of the head-up display positioning device of FIGS.
Figure 7A:
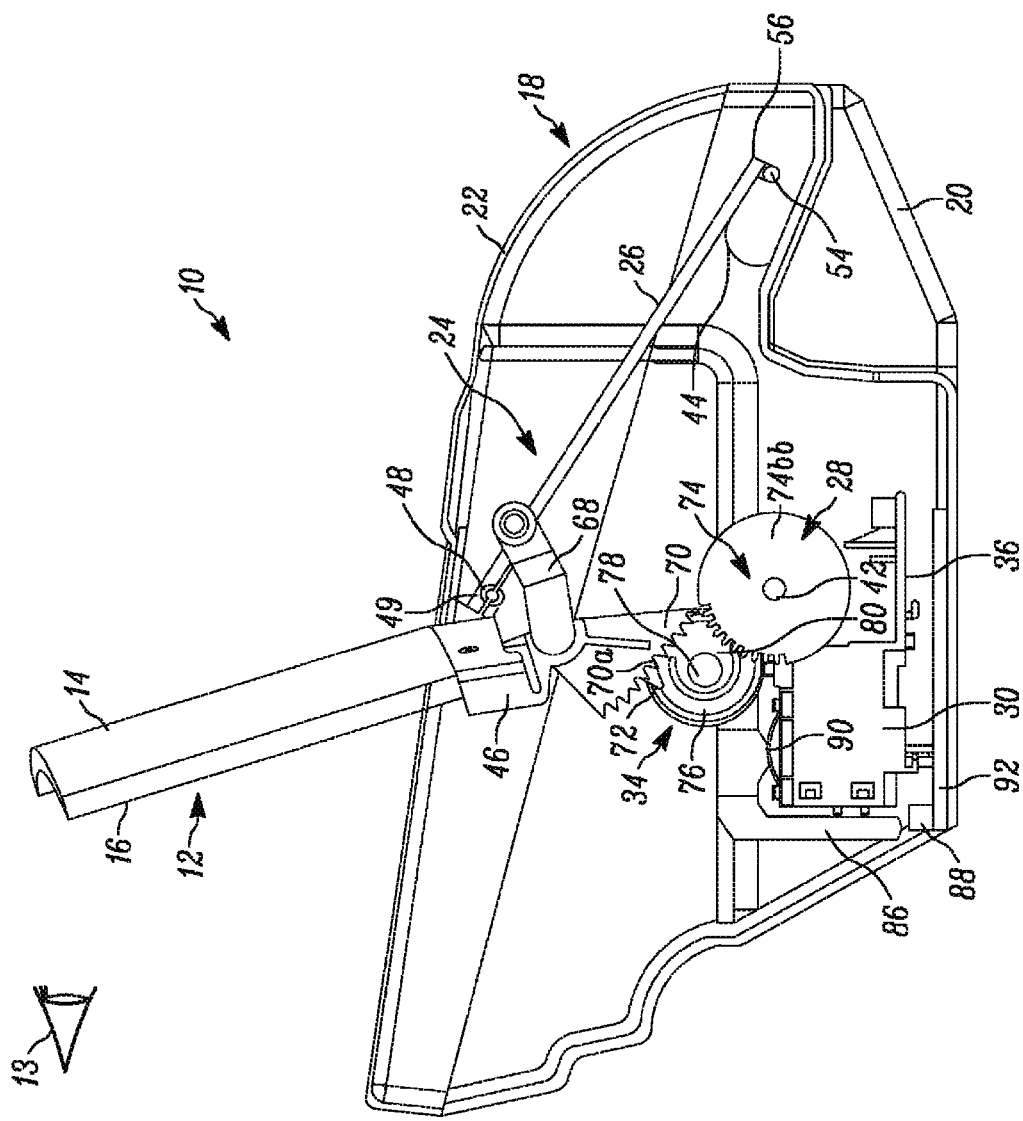
Figure 7B:
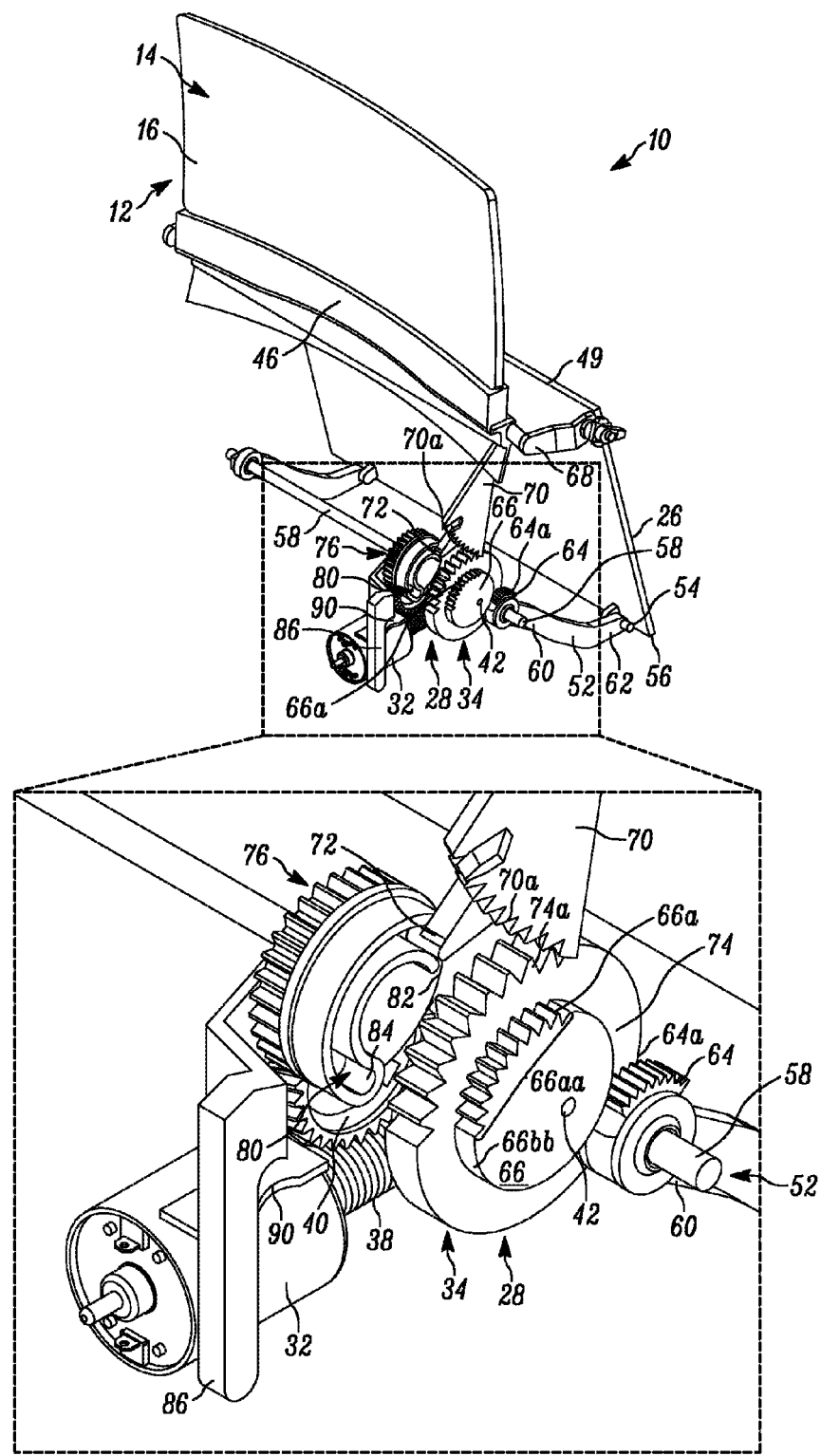
Figure 8A:
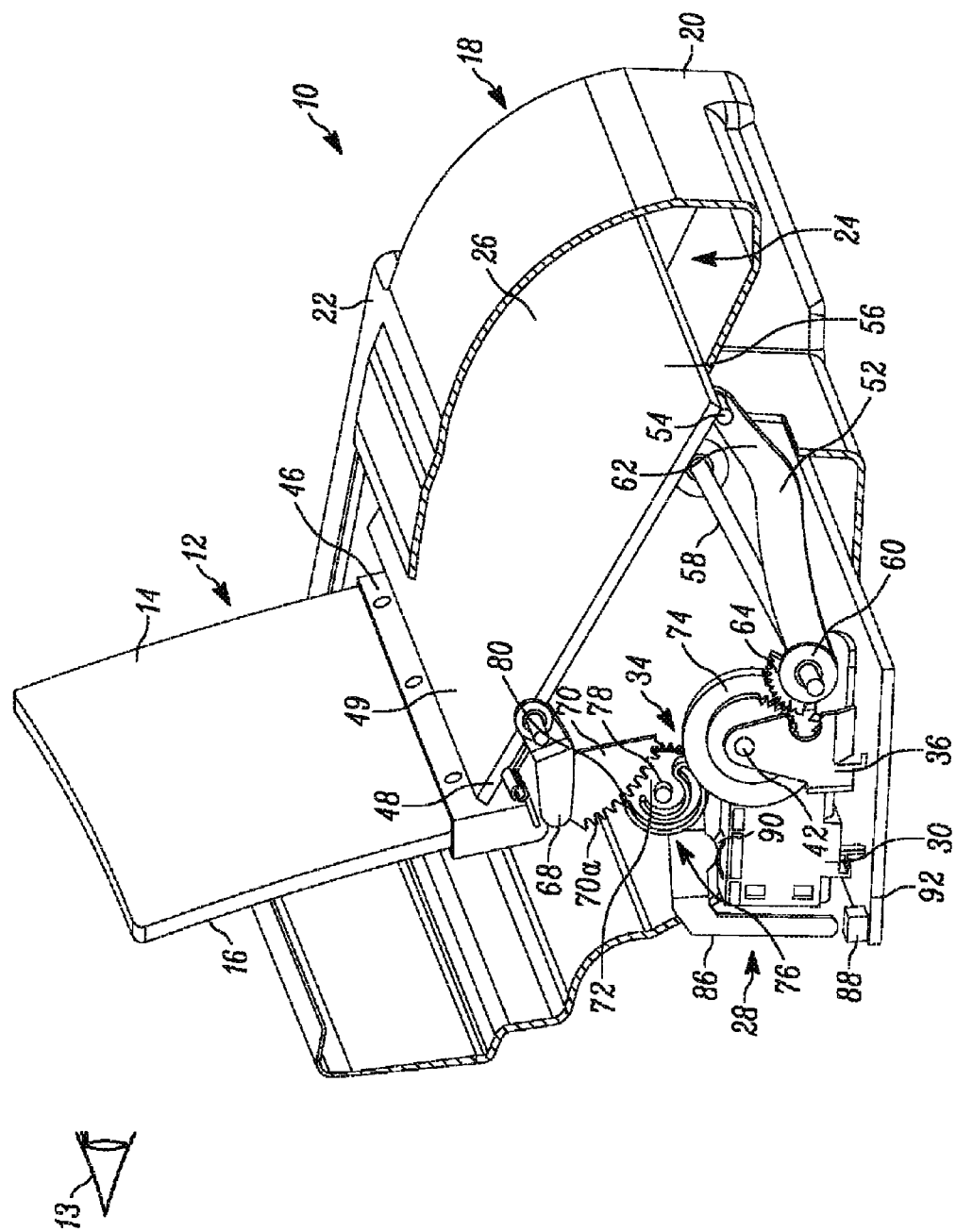
Figure 8B:
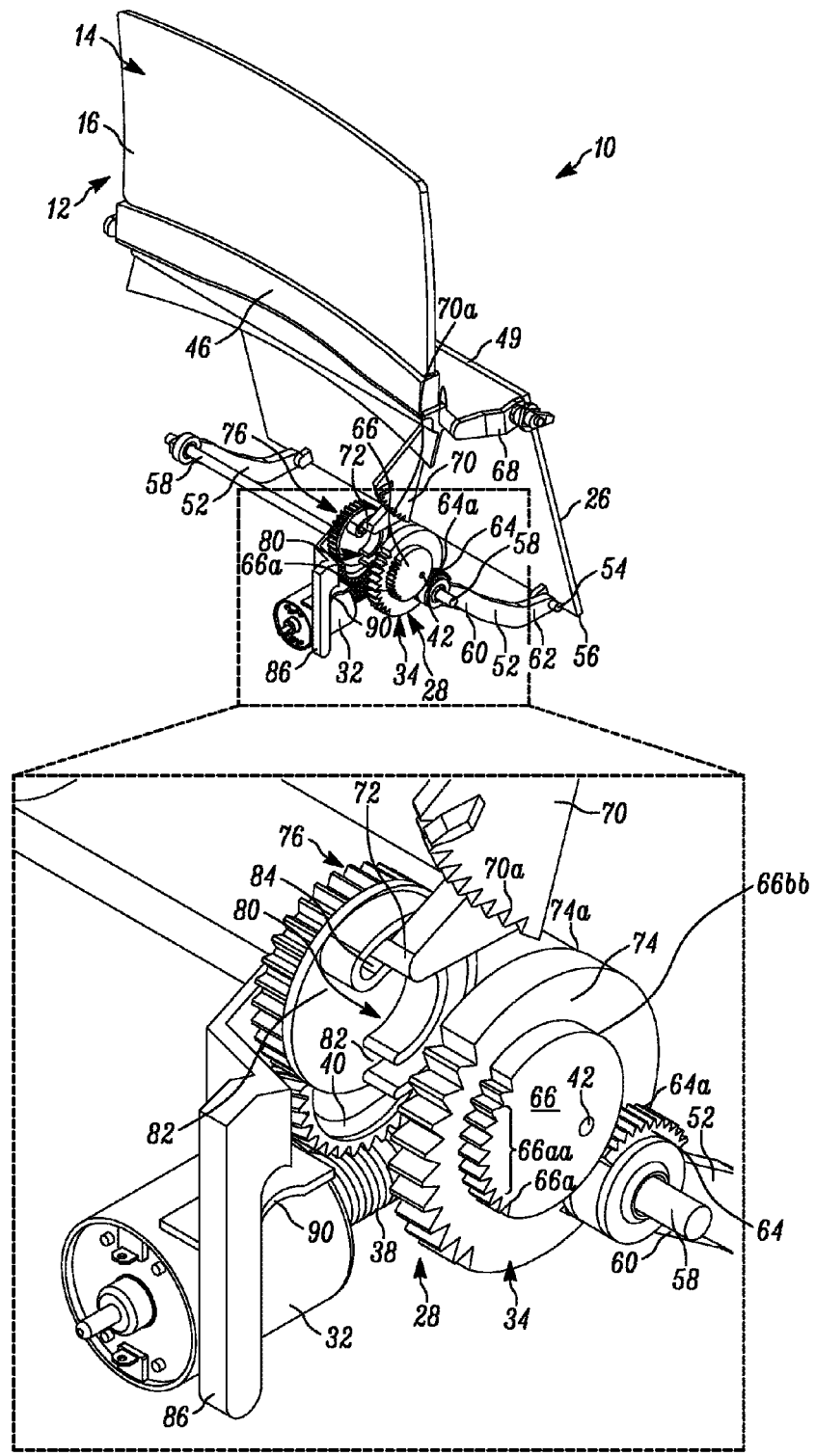
Figure 8C:
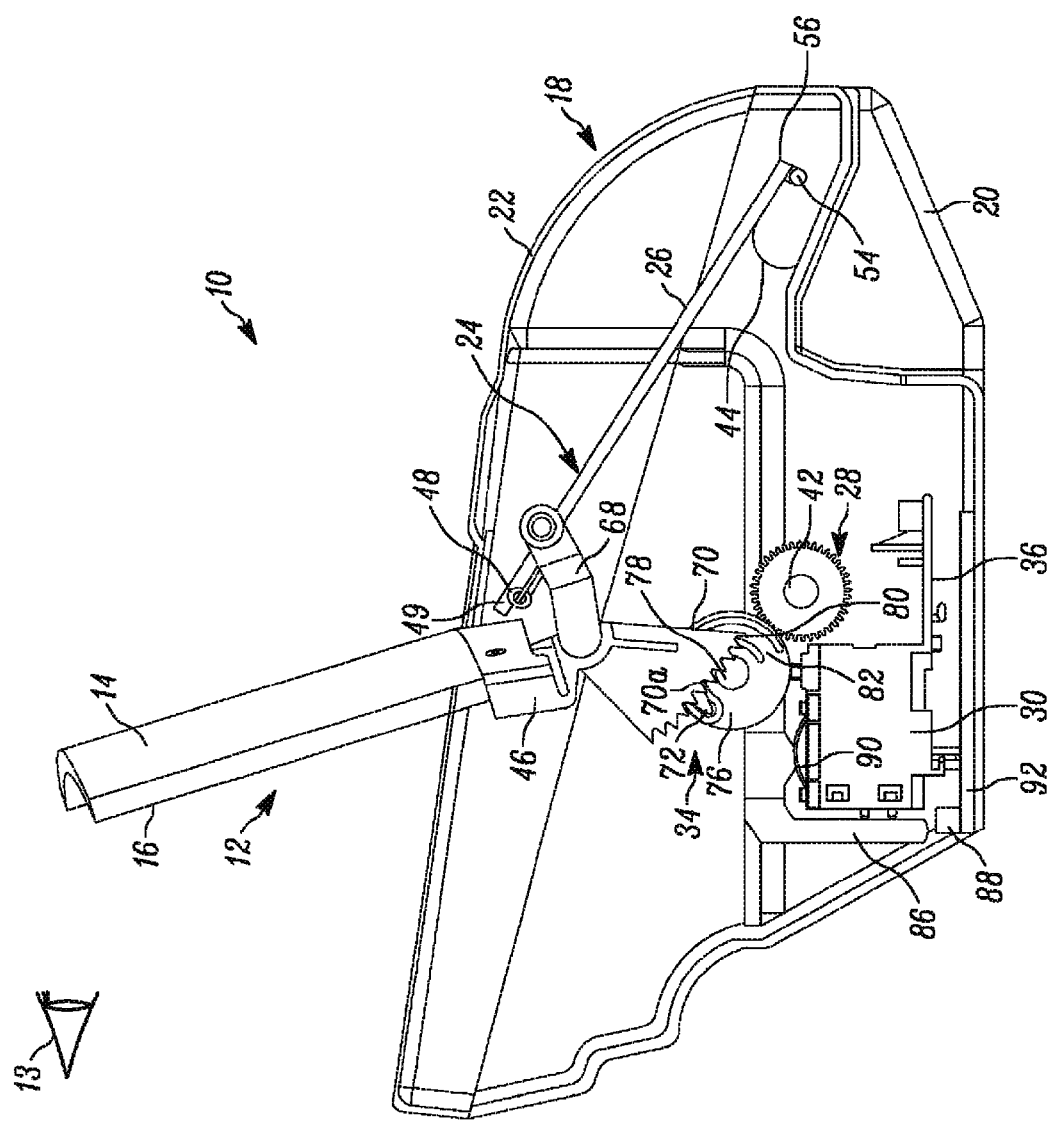
Figure 9:
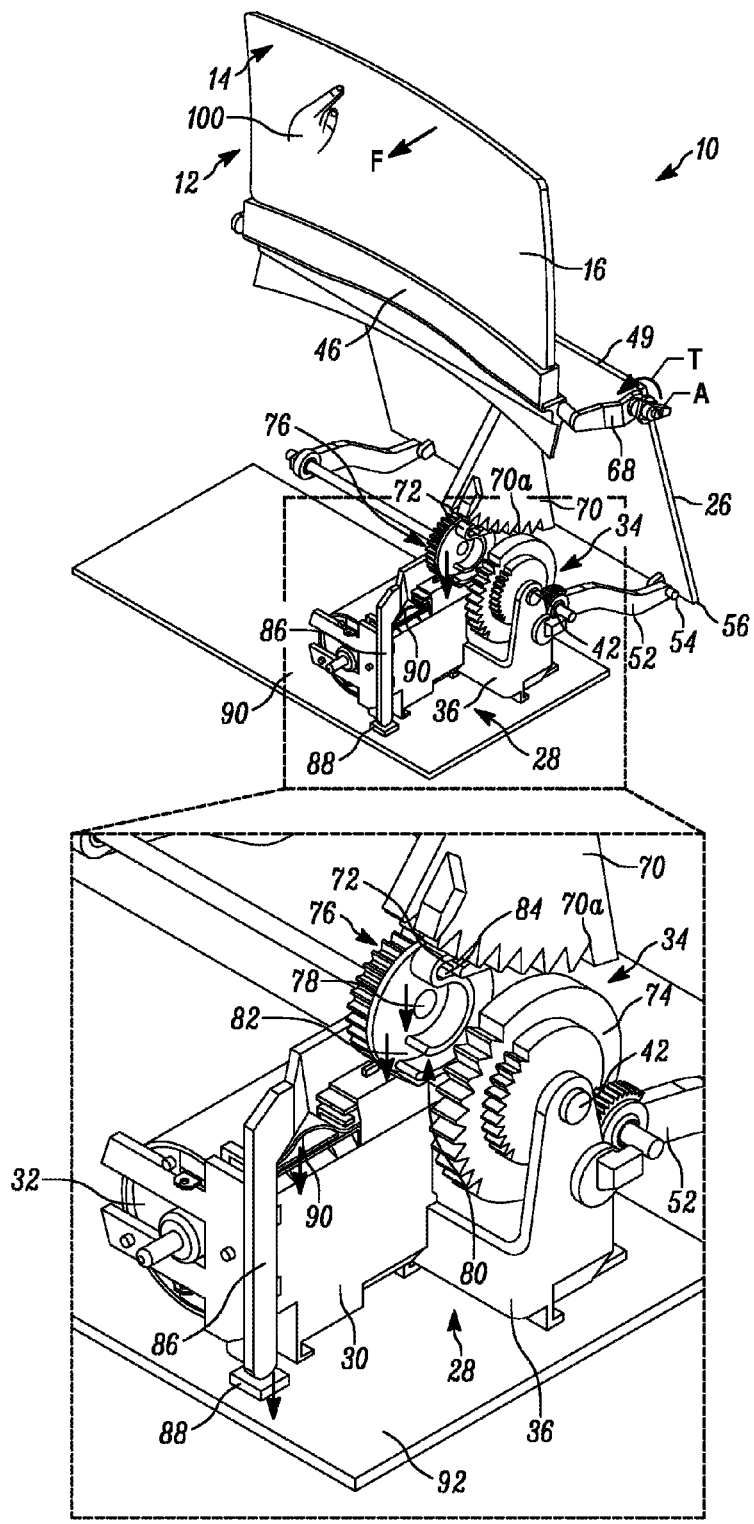

1A-5 in a fifth partially open position with a blown-up section, in accordance with the principles of the present disclosure;

FIG. 7A is a left side cutaway view of a portion of the head-up display positioning device of FIGS. 1A-6 in an open position, in accordance with the principles of the present disclosure;

FIG. 7B is a perspective left-front side cutaway view of a portion of the head-up display positioning device of FIGS. 1A-7A in the open position with a blown-up section, in accordance with the principles of the present disclosure;

FIG. 8A is a perspective left-rear side cutaway view of a portion of the head-up display positioning device of FIGS. 1A-7B in a display position, in accordance with the principles of the present disclosure;

FIG. 8B is a perspective left-front side cutaway view of a portion of the head-up display positioning device of FIGS. 1A-8A in a display position with a blown-up section, in accordance with the principles of the present disclosure;

FIG. 8C is a left side cutaway view of a portion of the head-up display positioning device of FIGS. 1A-8B in a display position, in accordance with the principles of the present disclosure; and FIG. 9 is a perspective left-front side cutaway view of a portion of the head-up display positioning device of FIGS. 1A-8C in a misuse activation position with a blown-up section, in accordance with the principles of the present disclosure.

Various of the views show certain elements cut away or cut out of the view in order to reveal components therebehind. The drawings should be viewed as a whole to understand the relationships between the various components.

DETAILED DESCRIPTION

As shown in the Figures, a head-up positioning device assembly is illustrated and generally designated at 10. The head-up positioning device 10 houses a head-up display (HUD) system 12 for a motor vehicle or aircraft, which can be positioned in a cabin of a vehicle, and in some examples, in front of a steering wheel. The HUD system 12 is operable to display information or context in the form of one or more images or graphics. For instance, the content can include one or more conditions of the vehicle, such as fuel level, battery level, odometer readings, velocity or a warning. In other examples, the HUD system 12 is a multimedia device operable to display content in the form of navigational data, imagery, radio data or a menu for interacting with another system of the vehicle or another system located remotely from the vehicle. However, other content is contemplated.

The HUD system 12 can be in electrical communication, being wired or wirelessly, with another digital system onboard the vehicle, such as a backup guidance camera or a vehicle controller operable to perform various system tasks. In other examples, the head-up display system 12 displays information from a remote system, such as information based on a location of the vehicle including an advertisement provided by a commercial entity. The HUD system 12 can also be a stand-alone system. Other systems may benefit from the teachings herein, including other ground-based systems, aircraft systems, handheld mobile devices and other computing devices. In some examples, the HUD system 12 is operable to replicate or mirror the display contents of a computing device such as a mobile device or a smartphone.

The HUD system 12 shows information in the line of sight of the vehicle occupant, whose eye is shown at 13. Thus, the HUD system 12 is operable to project a virtual image in the line of sight of the occupant, at a point outside the vehicle, so that that occupant (where the occupant may be the driver) does not need to take his or her eyes 13 off of the road. The virtual image may be projected about two meters in front of the occupant, by way of example. Thus, the occupant gets all of the important information such as speed, warning signals, etc., without having to look away from the line of sight, and therefore, safety is improved. Such placement of the virtual image at a point outside of the vehicle allows for the feeling of an augmented reality, where the virtual image appears to be a part of the driving situation itself.

The HUD system 12 may include an image generator (not shown) configured to emit a generated image for eventual viewing by the vehicle occupant in the form of the virtual image. The image generator may include a light source and a display, by way of example, to project the generated image, by way of example. The generated image may be projected to a planar or aspherical fold mirror, which reflects the generated image toward a combiner 14, which is also called a combiner mirror. In some variations, the fold mirror may be omitted and the image generator may project the image directly to the combiner 14.

The combiner 14 may be provided as a curved see-through disc through which the occupant can see through to the windshield and the road. The combiner 14 may be oriented at an angle with respect to a horizontal center line of the vehicle, by way of example, and this angle may be adjustable in some variations to accommodate the heights of different occupants. The combiner 14 is configured to reflect the generated image in a field of view of the occupant to create the virtual image. Though the generated image is reflected by the combiner 14 toward the occupant, the occupant sees the image as a virtual image that appears to be outside of the vehicle beyond the front surface 16 of the combiner 14.

The present disclosure provides a system for positioning the combiner 14, which also opens and closes its protective cover and detects when an occupant is misusing the device, and protects against such misuse. Thus, the HUD positioning device assembly 10 includes a housing 18 configured to selectively stow the combiner 14. In other words, the combiner 14 may be stowed within the housing 18 in a stowed position and moved at last partially outside of the housing 18 in an open or display position.

The housing may include a lower housing part 20 and an upper housing part 22, if desired. For example, the inner components (which will be described below), may be assembled on the lower housing part 20, and then the upper housing part 22 may be fixed and attached to the lower housing part 20 to complete the housing 18. The housing 18 defines an enclosure area 24, in which the combiner 14 is enclosed in the stowed position as shown in FIGS. 1A-1E. A cover 26 closes over the upper housing part 22 in the stowed position to enclose and lock the combiner 14 within the enclosure 24 of the housing 18.

A mechanism 28 is employed to move the combiner 14 and the cover 26, so that the combiner 14 can be moved between the stowed position and an open position, as well as one or more display positions. For example, the display position may vary based on the height of the vehicle driver. The mechanism 28 includes a control unit 30 that includes a motor 32 therein or attached thereto, and a set of gears making up a gear box 34. (The control unit 30 is shown cutaway in FIG. 1C to reveal the contents of the control unit 30, including the motor 32 therein). In this example, the motor 32 is attached to the motor holder 36 by a fastener such as snaps or screws, and the motor 32 and control unit 30 are also attached to the lower housing part 20 by a fastener such as snaps or screws. The motor holder 36 serves as a support for the control unit 30 and the gear box 34.

As stated above, the mechanism 28 is configured to move the combiner 14 between a stowed position, wherein the combiner 14 is located fully within the housing 18, as shown in FIGS. 1A-1E, and a display position, wherein the combiner 14 is at least partially located outside of the housing 18 and viewable by the occupant, as shown in FIGS. 7A-8C.

The cover 26 is configured to close over the housing 18 when the combiner 14 is in the stowed position. The cover 26 is movable, however, to allow the combiner 14 to move into the display position. As will be described in further detail below, the cover 26 and the combiner 14 are movable simultaneously.

In the following paragraphs, additional details of the mechanism 28 will be described, as well as the movements of the cover 26 and the combiner 14.

Figure 1A:
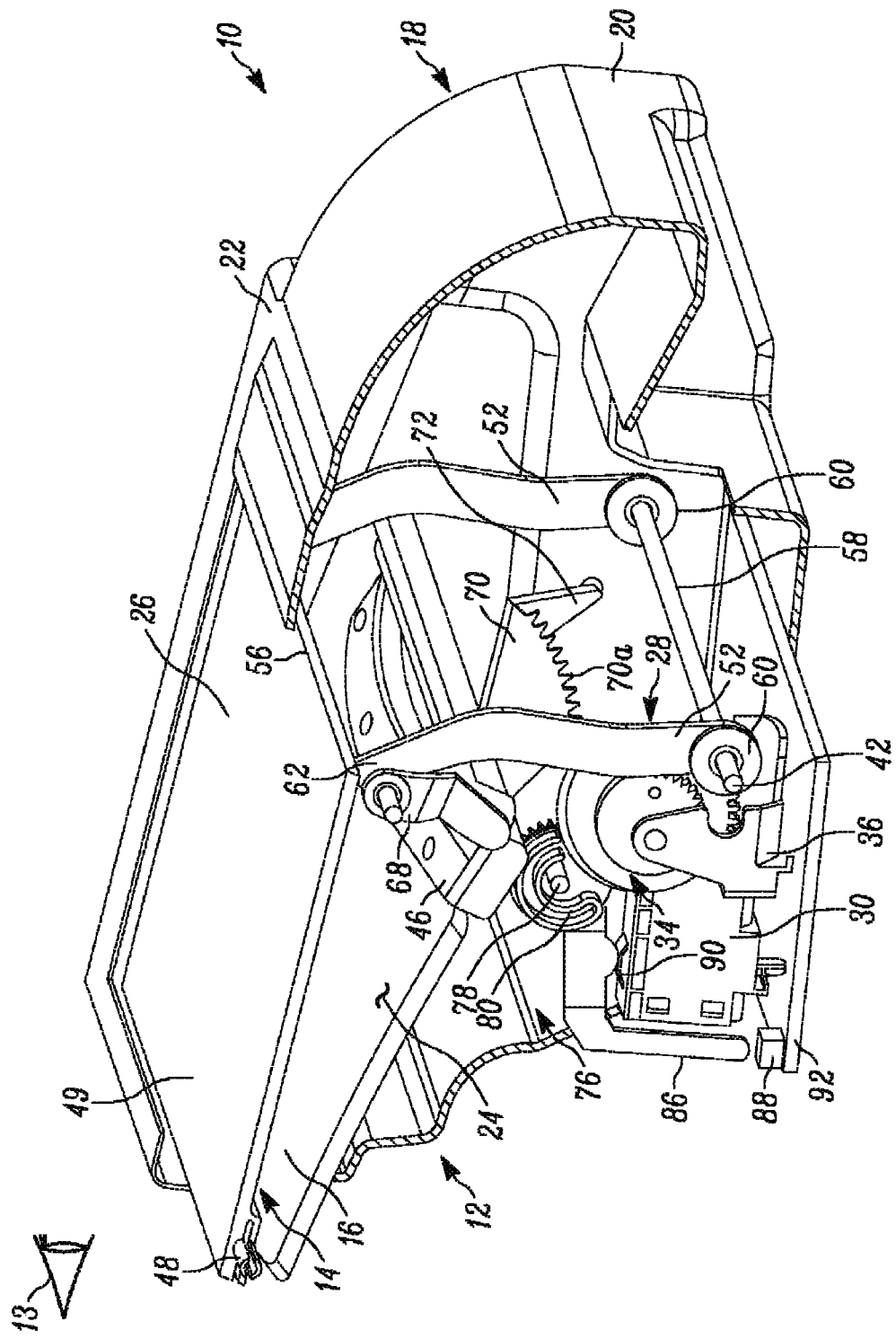
FIG. 1A is a perspective left-rear side cutaway view of a head-up display positioning device in a stowed position, in accordance with the principles of the present disclosure.
Figure 1B:
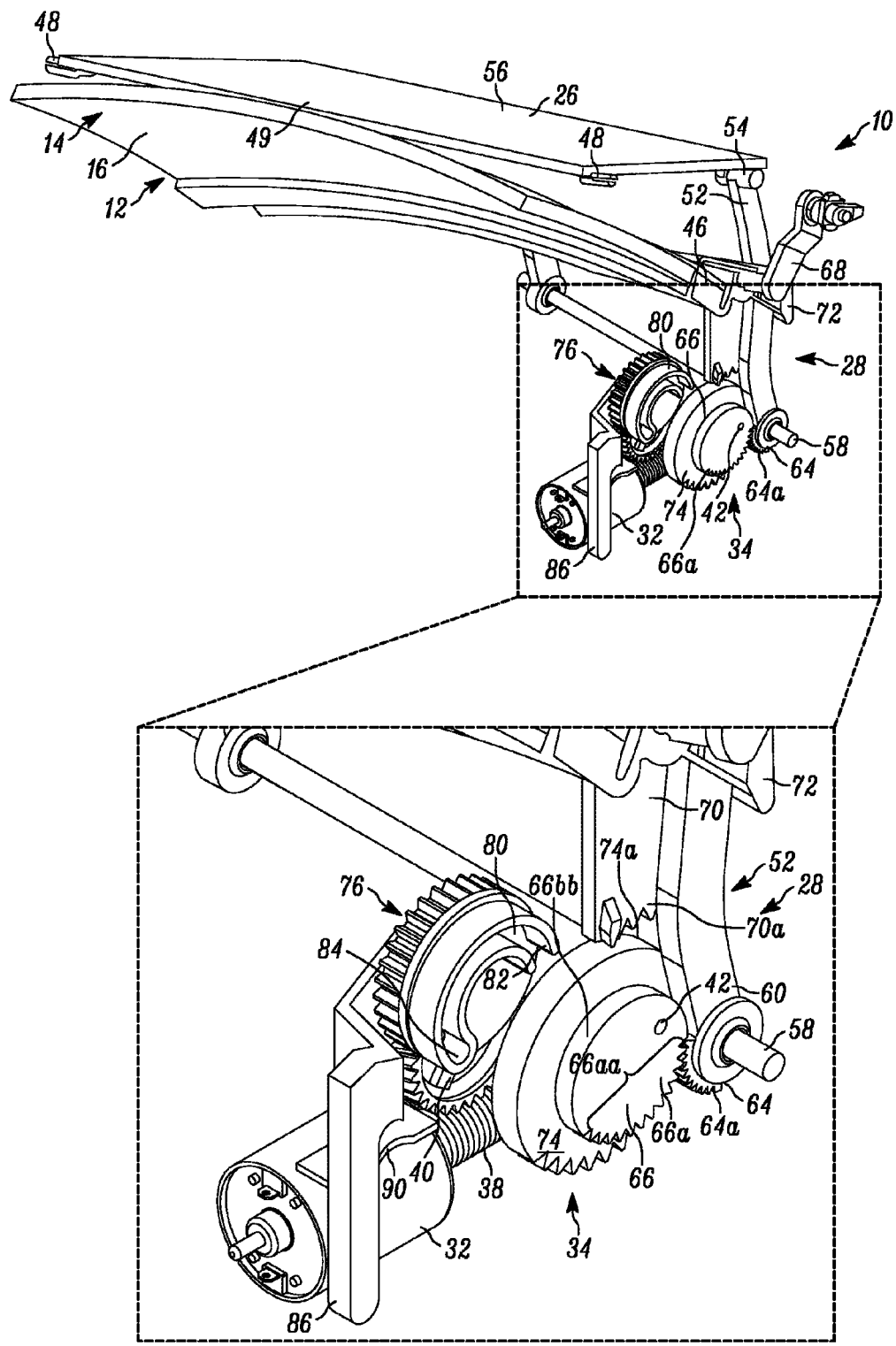
FIG. 1B is a perspective left-front side cutaway view of a portion of the head-up display positioning device of FIG. 1A in the stowed position with a blown-up section, in accordance with the principles of the present disclosure.
Figure 1C:
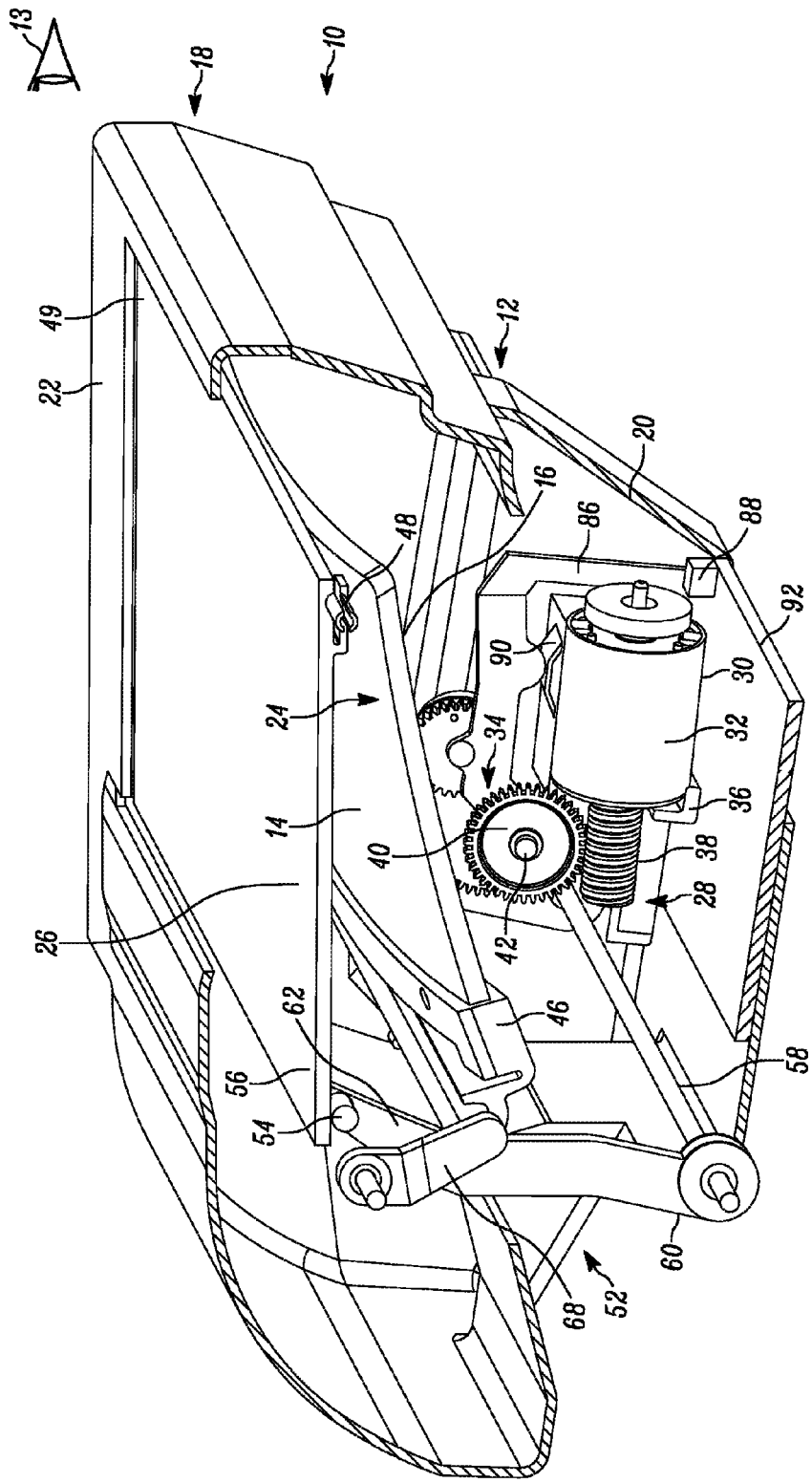
FIG. 1C is a perspective right-front side cutaway view of the head-up display positioning device of FIGS. 1A-1B in the stowed position, in accordance with the principles of the present disclosure.
Figure 1D:
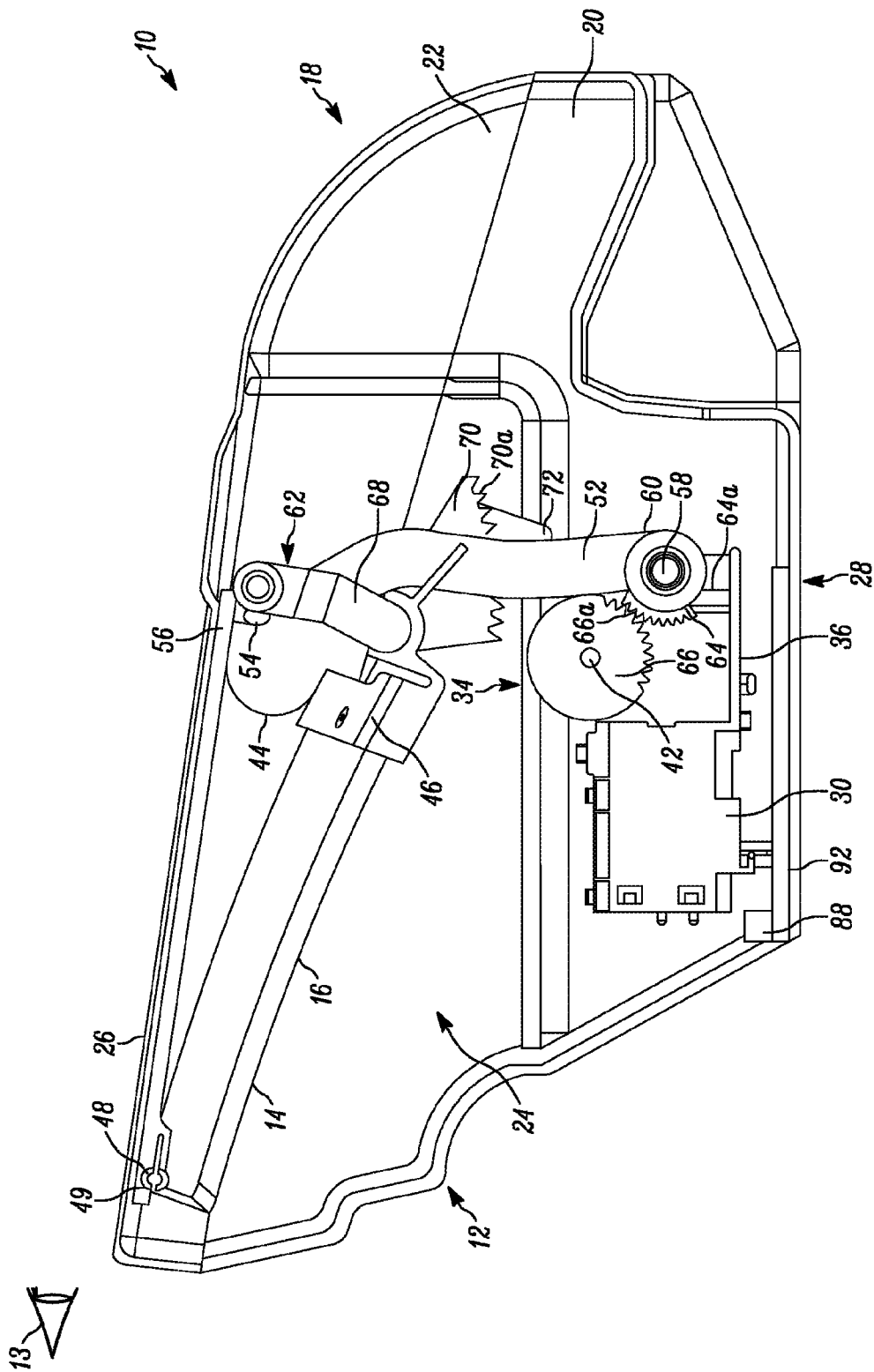
FIG. 1D is a cutaway left side view of a portion the head-up display positioning device of FIGS. 1A-1C in the stowed position, in accordance with the principles of the present disclosure.

The motor 32 drives a worm gear 38, which in turn drives a main gear 40 (see FIG. 1C). The main gear 40 is fixed on a main shaft 42, and therefore, the main gear 40 is operable to rotate the main shaft 42. The worm gear 38 and the main gear 40 may reduce the motor 32 output speed and increase output torque.

The positioning device 10 is initially shown in the stowed position of the combiner 14 in FIGS. 1A-1E. The cover 26 must move first (before the combiner 14), in order to move the combiner 14 out of the stowed position. Accordingly, the movement and associated components of the cover 26 will be described next.

A cover spring 44 may be attached to the cover 26, where the cover spring 44 is disposed between the combiner 14 and the cover 26 in the stowed position. The cover spring 44 may be configured to reduce rattling of the cover 26 against the housing 18, the combiner 14, or other components. In the stowed position, the cover spring 44 pushes against the cover 26 and a holder 46 of the combiner 14 to prevent rattling between the cover 26 and the combiner 14. The cover spring 44 may be assembled to the cover 26 by heat staking, snaps, press fit, or any other suitable method or combination of methods, by way of example.

The cover 26 may have front pins 48 connected to a front end 49 of the cover 26 that guide the cover 26 along two straight rails of the housing 18. At least one cover lever, such as a pair of cover levers 52, are rotatably connected to cover rear pins 54 that are connected to and extend from a rear end 56 of the cover 26. A cover rotation shaft 58 is supported for rotation by an extension of the lower housing part 20. The cover levers 52 are coupled to the cover rotation shaft 58 at first ends 60 of the cover levers 52. The cover levers 52 are connected to the cover rear pins 54 at second ends 62 of the cover levers 52. A cover driven gear 64 is also connected to and mounted on the cover rotation shaft 58.

A cover driving gear 66 is mounted on and fixed to the main shaft 42 of the gear box 34. Therefore, the cover driving gear 66 is driven with the motor 32, through the main gear 40 and the worm gear 38. When the motor 32 starts turning, it drives the cover driving gear 66, for example, in the counterclockwise direction. The cover driving gear 66 has teeth 66a that are in meshing engagement with teeth 64a of the cover driven gear 64, in the stowed position and as the cover 26 starts to open. Accordingly, the cover driving gear 66 is operable to drive the cover driven gear 64 in a clockwise direction, which pulls the cover 26 in a rearward direction and begins to open the cover 26.

Figure 2:
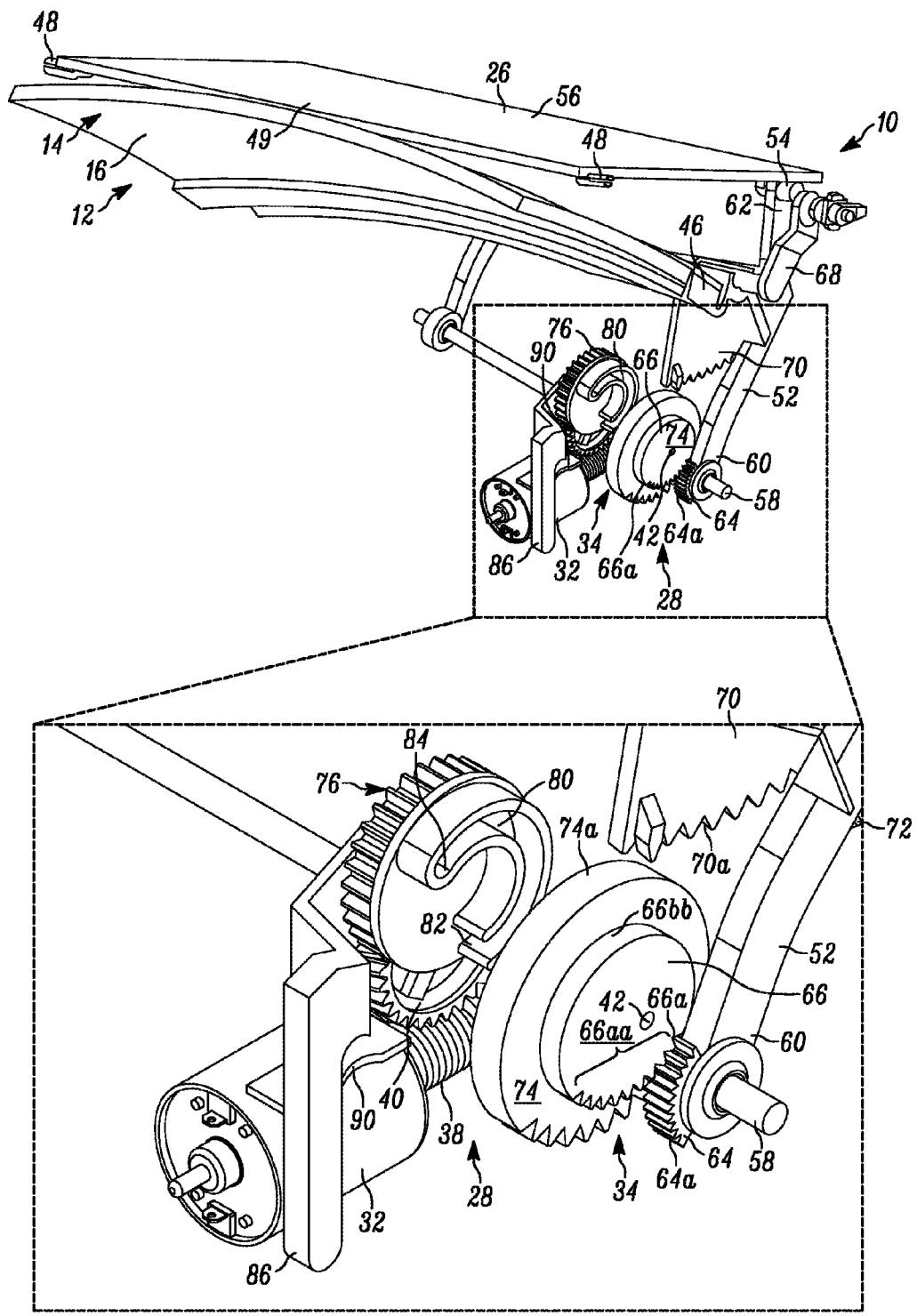
FIG. 2 is a perspective left-front side cutaway view of a portion of the head-up display positioning device of FIGS. 1A-1E in a first partially open position with a blown-up section, in accordance with the principles of the present disclosure.
Figure 3:
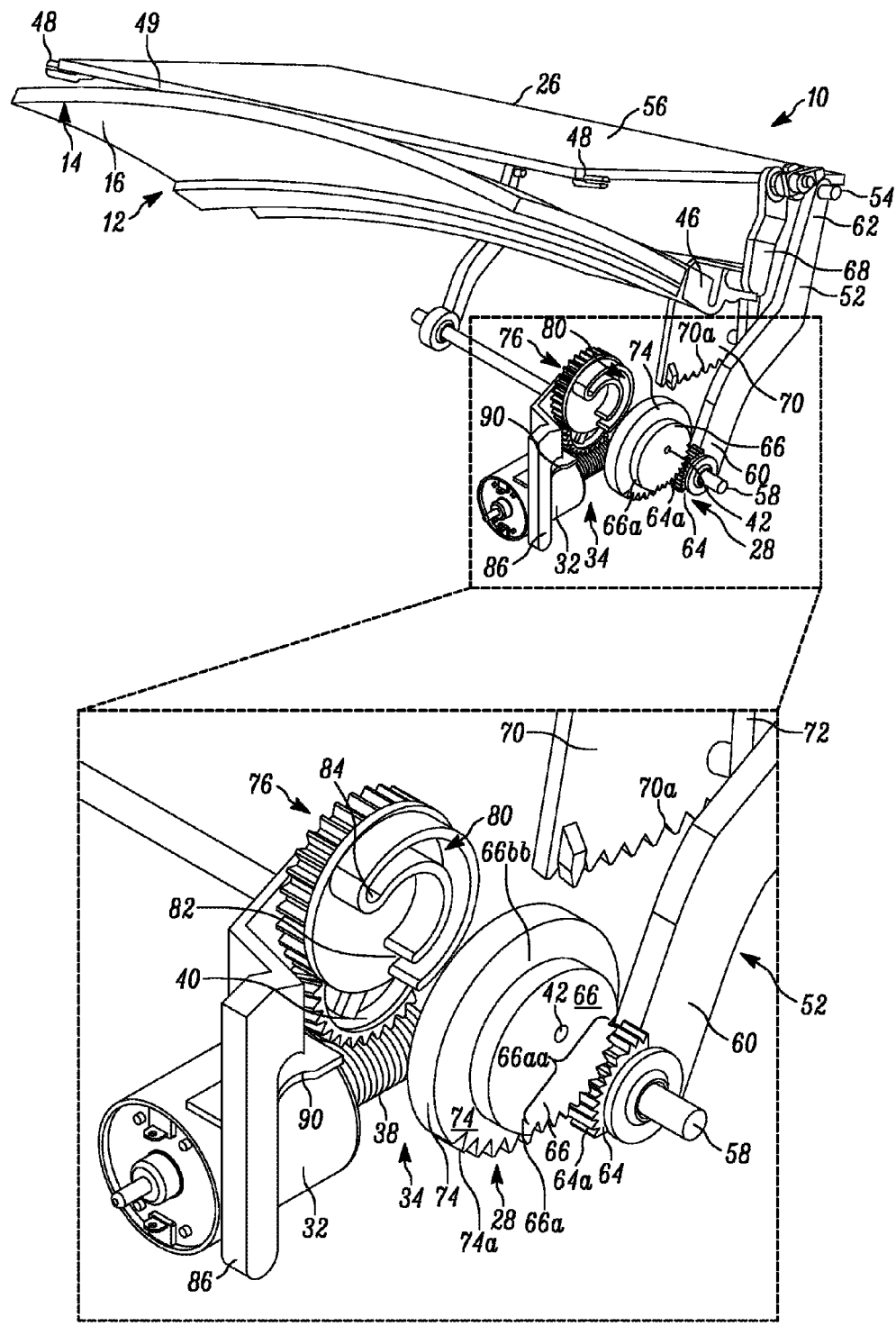
FIG. 3 is a perspective left-front side cutaway view of a portion of the head-up display positioning device of FIGS. 1A-2 in a second partially open position with a blown-up section, in accordance with the principles of the present disclosure.
Figure 4:
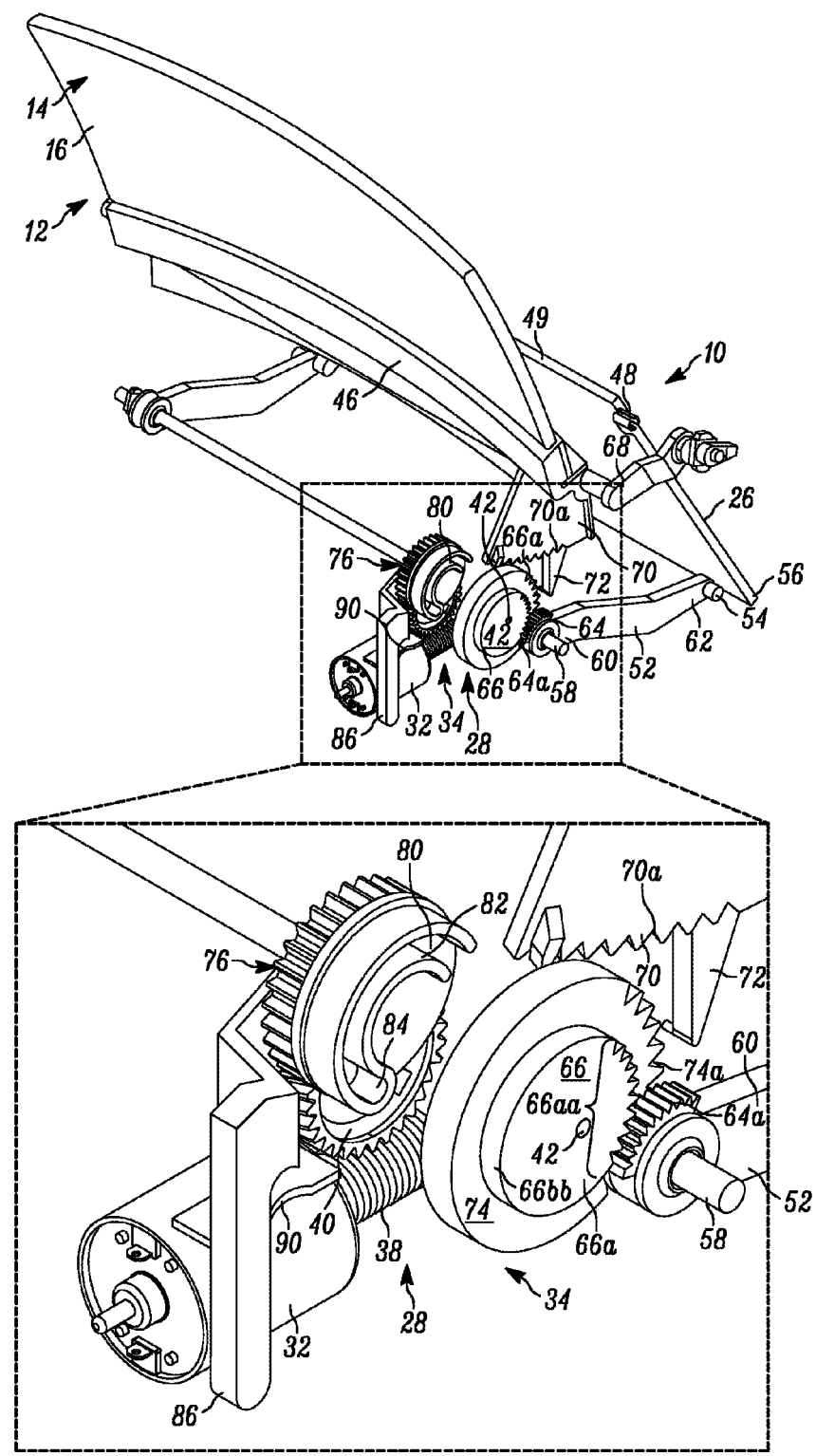
FIG. 4 is a perspective left-front side cutaway view of a portion of the head-up display positioning device of FIGS. 1A-3 in a third partially open position with a blown-up section, in accordance with the principles of the present disclosure.

Referring to FIG. 2, the cover 26 is shown in a very slightly open position, wherein the teeth 66a of the cover driving gear 66 have engaged with the teeth 64a of the cover driven gear 64 and the cover driving gear 66 has just started to rotate the cover driven gear 64 and the cover levers 52. FIG. 3 shows the cover 26 slightly more open than in FIG. 2, and FIG. 4 shows the cover 26 more open than in FIG. 3. FIG. 5 shows the cover 26 completely open, so that the combiner 14 is in a partially open position, but the combiner 14 has the capability of moving further still from the enclosure 24. However, the cover 26 cannot move much further than shown in FIG. 5 because the teeth 64a, 66a of the cover gears 64, 66 are at the end of their travel. FIG. 6 illustrates that the teeth 64a, 66a are no longer engaged, and therefore, the mechanism 28 is no longer moving the cover 26.

Thus, referring to FIGS. 7A-7B, the cover 26 is in its most open position, which allows the combiner 14 to be positioned for use in the display positions. The cover spring 44 is disposed between the cover 26 and the lower housing part 20 when the cover 26 is fully open. The combiner holder 46 pushes against the front end 49 of the cover 26 to hold the cover 26 open. The cover 26 opens before the combiner 14 reaches the combiner's display position to avoid a collision. For this reason, the toothed segment 66aa of the cover driving gear 66 is preferably only as long as required to bring the cover 26 to its fully open position. (The toothed segment 66aa is the segment that includes the teeth 66a). Once the cover 26 is fully open, a flat segment 66bb (segment having a smooth curve and no teeth) of the cover driving gear 66 continues to push the last teeth 64a of the cover driven gear 64 all the way until the combiner holder 46 pushes the cover 26, compressing the cover spring 44 and bringing the cover driven gear 64 away from the reach of the cover driving gear 66 (see, e.g., FIG. 8B).

The movement of the combiner 14 into the open position, and subsequently the fine adjustment of the combiner 14, will now be described. The combiner 14 may be attached to the combiner holder 46 by gluing, welding, screws, press fit, or any other suitable method or combination of methods. The combiner holder 46 is attached to a combiner rotation shaft 68, which may be attached with any suitable fastener, but using a removable fastener, such as screws, allows the combiner 14 to be replaced in the aftermarket. The combiner rotation shaft 68 is connected to a combiner driven gear 70. Thus, the combiner driven gear 70 is coupled to the combiner 14 and the combiner holder 46 through the combiner rotation shaft 68, by way of example. The combiner driven gear 70 has a set of combiner driven gear teeth 70a. A fine adjustment pin 72 extends from the combiner driven gear 70.

A combiner driving gear 74 is mounted to and fixed to the main shaft 42. The combiner driving gear 74 has a set of combiner driving gear teeth 74a, where the combiner driven gear teeth 70a are selectively in meshing engagement with the combiner driving gear teeth 74a. The combiner driving gear 74 has a toothed segment 74aa on which the combiner driving gear teeth 74a are disposed, and the combiner driving gear 74 also has a flat segment 74bb (see FIG. 1E), on which no teeth are disposed and which may have a smooth, curved surface.

Figure 1E:
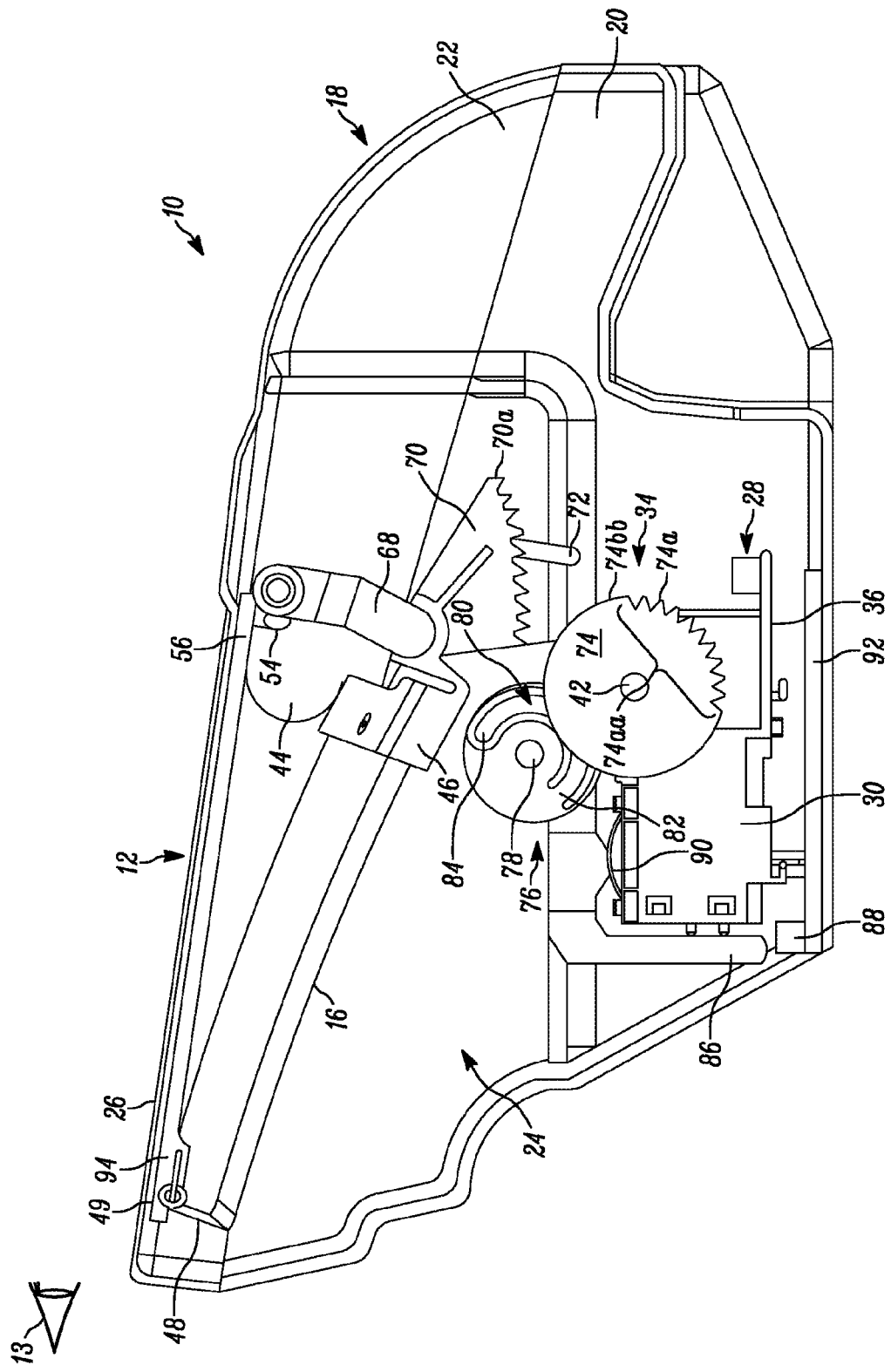
FIG. 1E is a cutaway left side view of another portion the head-up display positioning device of FIGS. 1A-1D in the stowed position, in accordance with the principles of the present disclosure.

Since the combiner driving gear 74 is mounted on the main shaft 42, the combiner driving gear 74 turns in the counterclockwise direction as the combiner 14 moves from the stowed position to the open position and/or the display position. Referring to FIG. 1E, while the cover 26 starts moving from the closed, stowed position into the cover's 26 fully open position, the flat segment 74bb of the combiner driving gear 74 slides on the first tooth 70a of the combiner driven gear 70 and therefore, the combiner 14 stays in the stowed position. After the combiner driving gear 74 partially rotates, the toothed segment 74aa of the combiner driving gear 74 reaches the teeth 70a of the combiner driven gear 70, and the combiner driving gear 74 then starts to the turn the combiner driven gear 70 in the clockwise direction, and the combiner 14 then starts turning into an open position toward the display position of the combiner 14.

When the combiner driving gear 74 and the combiner driven gear 70 reach the end of their sets of teeth 74a, 70a (as shown in FIGS. 7A-7B), the combiner 14 is in the open position and at the start point for one of the display positions, which at this point corresponds to the shortest driver (lowest position of the eyes 13). The combiner 14 may then be finely adjusted into the best display position for the height of the individual driver.

To this end, the mechanism includes a fine adjustment cam 76 mounted on or fixed to a misuse pin 78. In this example, the misuse pin 78 is independently movable with respect to the main shaft 42, and each of the cover rotation shaft 58, the main shaft 42, and the misuse pin 78 are disposed parallel to each other. The fine adjustment cam 76 defines a slot 80 having a non-uniform radius.

After the segments including the teeth 74a, 70a of the combiner driving gear 74 and the combiner driven gear 70 reach their ends, and the main shaft 42 is still rotating in a forward direction, the fine adjustment pin 72 enters the slot 80 of the fine adjustment cam 76, and the teeth 70a, 74a separate. The fine adjustment pin 72 is configured to slide along the slot 80 of the fine adjustment cam 76. In this example, the radius of the slot 80 decreases along the fine adjustment cam 76 from the entry point 82, where the fine adjustment pin 72 enters the slot 80, to the end 84 of the slot 80. The fine adjustment pin 72, which extends from the combiner driven gear 70, starts sliding in the slot 80 while the last teeth 70a of the combiner driven gear 70 are still in contact with the teeth 74a of the combiner driving gear 74.

When the gears 70, 74, 64, 66 are moving along with their respective teeth 70a, 74a, 64a, 66a in meshing engagement, the combiner 14 and/or the cover 26 move quickly. The cam 76 movement is slower and more fine tuned than the movement along the teeth 70a, 74a, 64a, 66a, to adjust for the height of the driver.

Accordingly, the combiner 14 can be positioned into a display position based on the height of the particular driver. For example, FIGS. 7A-7B show the combiner 14 at the display position for a person having the lowest eye position (the shortest driver), where the fine adjustment pin 72 is disposed at or near the entry 82 of the slot 80 of the fine adjustment cam 76. On the other hand, FIGS. 8A-8C show the combiner 14 at the display position for a person having the highest eye position (the tallest driver), wherein the fine adjustment pin 72 is disposed at or near the end 84 of the slot 80 of the fine adjustment cam 76. Moreover, the cover 26 and the combiner 14 are each positioned, opened, and closed with a single motor 32.

The device 10 may also function to protect against misuse of the combiner 14. To this end, a misuse arm 86 and a misuse button 88 are provided. The misuse arm 86 is coupled to the main shaft 42 and held in position and biased away from the misuse button 88 by a misuse spring 90, which may be a leaf spring, by way of example. The fine adjustment cam 76 is mounted on the misuse arm 86 through the misuse pin 78. The misuse button 90 may be mounted directly on a printed circuit board 92, or otherwise connected to the printed circuit board 92, by way of example. The misuse button 90 may be mounted on the PCB 92 by welding, snapping, or any other suitable method.

Referring to FIG. 9, if a predetermined external force F is applied to the combiner 14, for example, by the driver or occupant 100 pulling on the combiner 14, the mechanism 28 automatically stows the combiner 14 in the stowed position within the housing 18 and closes the cover 26.

More particularly, when the occupant 100 pulls on the combiner 14 with the predetermined force F, a torque T is created on the axis A at the front side 49 of the cover 26. The force caused by the force F and the torque T is transmitted to the fine adjustment pin 72, moving the fine adjustment pin 72 in a downward direction. The fine adjustment cam 76 is configured to be displaced in a downward direction by the fine adjustment pin 72 when the predetermined force F is applied to the combiner 14. When the fine adjustment cam 76 moves downward, it pushes the misuse pin 78 downward against the misuse arm 86, and the misuse arm compresses against the misuse spring 90. The misuse arm 86 also pushes down on or engages the misuse button 88, thereby activating the misuse button 88.

The misuse button 88 is configured to activate a controller, such as the control unit 30 and the PCB 92, to cause the mechanism 28 to automatically stow the combiner 14 in the stowed position within the housing 18 and close the cover 26 against the upper housing part 22. Thus, the motor 32 is configured to rotate the main shaft 42 in both a forward direction and an opposite backward direction.

For example, to open the positioning device 10, the motor 32 causes the main shaft 42 to rotate in the forward direction; and to move the combiner 14 from the open position and/or the display position to the stowed position, the motor 32 causes the main shaft 42 to rotate in the backward direction, which may move the fine adjustment pin 72 from within the slot 80 to out of the slot 80 and move the gears 70, 74, 64, 66 in reverse from the direction the gears 70, 74, 64, 66 were rotated to open the device 10, as described above.

Thus, after the force F is released from the combiner 14, the misuse spring 90 biases the misuse arm 86 away from the misuse button 88 (which has already been activated), and the control unit 30 causes motor 32 and the rest of the mechanism 28 to bring the combiner 14 automatically to the stowed position and close the cover 26 against the housing 18.

The system may be controlled by a controller, which may include the PCB 92 and/or the control unit 30. The controller may include a processor, a memory and an interface. For example, the PCB 92 may have the required hardware and software to drive the mechanism 28 into and out of the stowed, open, and display positions. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the algorithm for operating the combiner 14 or the movement of the combiner 14 and of the head-up display system 12 as described herein. The interface facilitates communication with the other systems or components of the vehicle. In some examples, the controller may be a portion of the vehicle control system, another system, or a stand-alone system.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A head-up display positioning device comprising:
   a combiner configured to reflect a generated image to create a virtual image for viewing by an occupant of a vehicle;
   a housing configured to selectively stow the combiner;
   a mechanism including a motor configured to move the combiner between a stowed position wherein the combiner is located fully within the housing and a display position wherein the combiner is at least partially located outside of the housing and viewable by the occupant;
   a cover configured to close over the housing when the combiner is in the stowed position, the cover being movable to allow the combiner to move into the display position,
   wherein the mechanism is configured to automatically stow the combiner in the stowed position within the housing and close the cover when a predetermined external force is applied to the combiner;
   a misuse arm configured to be moved when the predetermined external force is applied to the combiner
   wherein, the cover and the combiner are movable simultaneously; and
   wherein the mechanism comprises a main shaft and the motor is configured to rotate the main shaft in both a forward direction and an opposite backward direction, the mechanism being further configured to move the combiner into an open position between the display position and the stowed position;
   the head-up display device further comprising a misuse arm coupled to the main shaft, the mechanism comprising a cover driving gear fixed to the main shaft, and the mechanism further comprising a combiner driving gear fixed to the main shaft, the misuse arm being configured to be moved when the predetermined external force is applied to the combiner; and
   wherein the head-up display device further comprise a misuse button configured to activate a controller to cause the mechanism to automatically stow the combiner in the stowed position within the housing and close the cover responsive to actuation of the misuse button.

2. The head-up display positioning device of claim 1, the mechanism further comprising a fine adjustment cam fixed to a misuse pin, the fine adjustment cam being configured to be displaced when the predetermined force is applied to the combiner, the misuse arm being configured to be moved by the misuse pin, the misuse arm being configured to engage the misuse button.

3. The head-up display positioning device of claim 2, further comprising a printed circuit board, the misuse button being mounted on the printed circuit board.

4. The head-up display positioning device of claim 2, further comprising a misuse spring configured to bias the misuse lever away from the misuse button.

5. The head-up display positioning device of claim 4, the misuse pin being independently movable with respect to the main shaft.

6. The head-up display positioning device of claim 5, the mechanism further comprising a cover rotation shaft supported by an extension of the housing, the mechanism further comprising at least one cover lever connected to the cover rotation shaft at a first end of the cover lever, the cover lever rotatably connected to the cover at a second end of the cover lever, the cover rotation shaft, the main shaft, and the misuse pin being parallel to each other.

7. The head-up display positioning device of claim 6, the mechanism further comprising a combiner driven gear coupled to the combiner and having a set of combiner driven gear teeth, the mechanism further comprising a combiner driving gear fixedly attached to the main shaft and having a set of combiner driving gear teeth, the combiner driven gear teeth being selectively in meshing engagement with the combiner driving gear teeth.

8. The head-up display positioning device of claim 7, the cover lever having a set of cover driven gear teeth disposed at the first end of the cover lever, the mechanism further comprising a cover driving gear fixedly attached to the main shaft and having a set of cover driving gear teeth, the cover driven gear teeth being selectively in meshing engagement with the cover driving gear teeth.

9. The head-up display positioning device of claim 8, the mechanism further comprising a fine adjustment pin extending from the combiner driven gear, the fine adjustment cam defining a slot having a non-uniform radius, the fine adjustment pin configured to slide along the slot of the fine adjustment cam.

10. The head-up display positioning device of claim 9, wherein the fine adjustment cam is mounted on the misuse arm, the slot having a decreasing radius such that the fine adjustment pin is configured to move toward a center of the fine adjustment cam as the fine adjustment pin travels from an entry toward an end of the slot.

11. The head-up display positioning device of claim 10, wherein the mechanism is configured such that if the combiner is pulled with the predetermined external force, the fine adjustment pin pushes the fine adjustment cam and the misuse pin, thereby displacing the misuse arm, and whereupon the misuse arm is configured to engage the misuse button when displaced by the fine adjustment pin.

12. The head-up display positioning device of claim 11, wherein the motor is configured to rotate the main shaft in the forward direction to move the combiner from the stowed position to the open position, and the motor is configured to rotate the main shaft in the backward direction to move the combiner from at least one of the open position and the display position to the stowed position.

13. The head-up display positioning device of claim 12, further comprising a cover spring attached to the cover, the cover spring being disposed between the combiner and the cover in the stowed position, and the cover spring being disposed between the cover and the housing in at least one of the open position and the display position, the cover spring being configured to reduce rattling of the cover.

14. A head-up display positioning device comprising:
   a combiner configured to reflect a generated image to create a virtual image for viewing by an occupant of a vehicle;
   a housing for stowing the combiner;

a mechanism including a motor configured to move the combiner between a stowed position wherein the combiner is located fully within the housing and a display position wherein the combiner is at least partially located outside of the housing and viewable by the occupant;

a cover configured to close over the housing when the combiner is in the stowed position, the cover being movable to allow the combiner to move into the display position; and a misuse arm configured to selectively activate a controller to cause the mechanism to automatically stow the combiner in the stowed position within the housing and close the cover when a predetermined force is applied to the combiner;

wherein, the cover and the combiner are simultaneously movable, the head-up display positioning device further comprising a misuse button configured to activate the controller to cause the mechanism to automatically stow the combiner in the stowed position within the housing and close the cover.

* * * * *